(12) United States Patent
Martz

(10) Patent No.: US 6,286,461 B1
(45) Date of Patent: Sep. 11, 2001

(54) PET CARRIER WITH CONVERTIBLE STRAPS

(75) Inventor: Gayle Martz, New York, NY (US)

(73) Assignee: Gayle Martz, Inc., New York, NY (US)

(*) Notice: Subject to any disclaimer, the term of this patent is extended or adjusted under 35 U.S.C. 154(b) by 0 days.

(21) Appl. No.: 09/293,519

(22) Filed: Apr. 15, 1999

Related U.S. Application Data

(63) Continuation-in-part of application No. 08/924,979, filed on Sep. 8, 1997, now Pat. No. 5,941,195.

(51) Int. Cl.⁷ .................................................... A01K 1/03
(52) U.S. Cl. ........................... 119/497; 224/153; 224/579
(58) Field of Search ..................................... 119/497, 482, 119/496, 498, 769, 771, 500, 501; 224/153, 578, 579

(56) References Cited

U.S. PATENT DOCUMENTS

| | | | |
|---|---|---|---|
| D. 254,631 | * | 4/1980 | Albright .............................. D30/109 |
| 3,850,144 | * | 11/1974 | Springer et al. ..................... 119/497 |
| 4,273,274 | * | 6/1981 | Freistadt ............................. 294/141 |
| 4,428,514 | * | 1/1984 | Elf ...................................... 224/579 |
| 4,977,857 | * | 12/1990 | Slawinski ........................... 119/497 |
| 4,986,458 | * | 1/1991 | Linday ................................ 224/160 |
| 5,176,102 | * | 1/1993 | Tracy .................................. 119/497 |
| 5,277,148 | * | 1/1994 | Rossignol et al. .................. 119/453 |
| 5,351,646 | * | 10/1994 | Zoroufy ............................. 119/497 |
| 5,415,332 | * | 5/1995 | Kliot ................................... 224/153 |
| 5,671,698 | * | 9/1997 | Farrugia ............................. 119/497 |
| 5,927,581 | * | 7/1999 | Reddy et al. ....................... 224/578 |
| 5,931,120 | * | 8/1999 | Burns et al. ........................ 119/497 |

FOREIGN PATENT DOCUMENTS

| | | |
|---|---|---|
| 0702894 | 3/1996 | (EP) . |
| 2760175 | 9/1998 | (FR) . |

\* cited by examiner

*Primary Examiner*—Peter M. Poon
*Assistant Examiner*—Son T. Nguyen
(74) *Attorney, Agent, or Firm*—Abelman, Frayne & Schwab

(57) ABSTRACT

A portable animal carrier is provided which is of a size to comfortably hold a small pet, such as a cat or dog, and may be placed under an airline seat. Carrier straps are included to provide a versatility of to table options, which include carrying the portable animal carrier as a backpack, shoulder bag, or hand tote. The portable animal carrier may preferably have a tapered contour to facilitate it smoothly lying against the user's body when being transported as a backpack or shoulder bag.

14 Claims, 2 Drawing Sheets

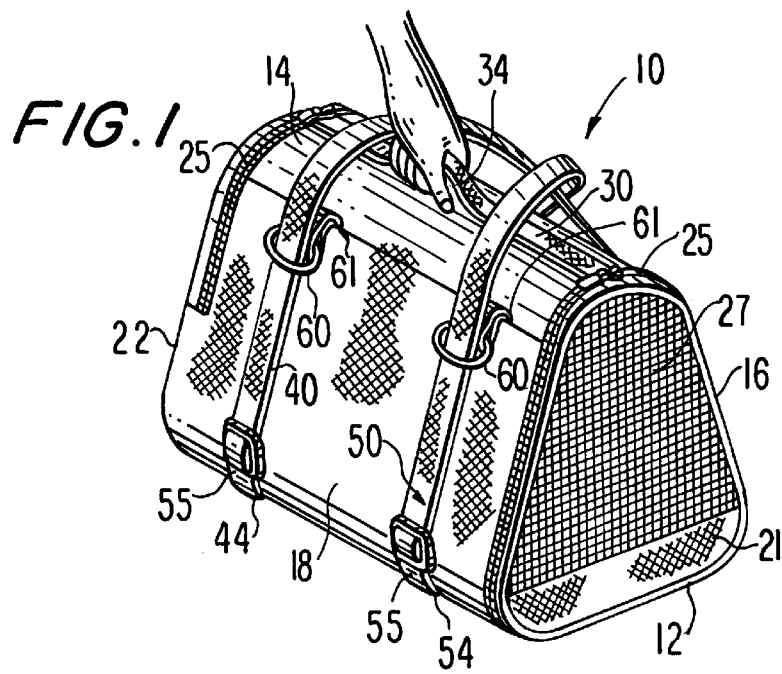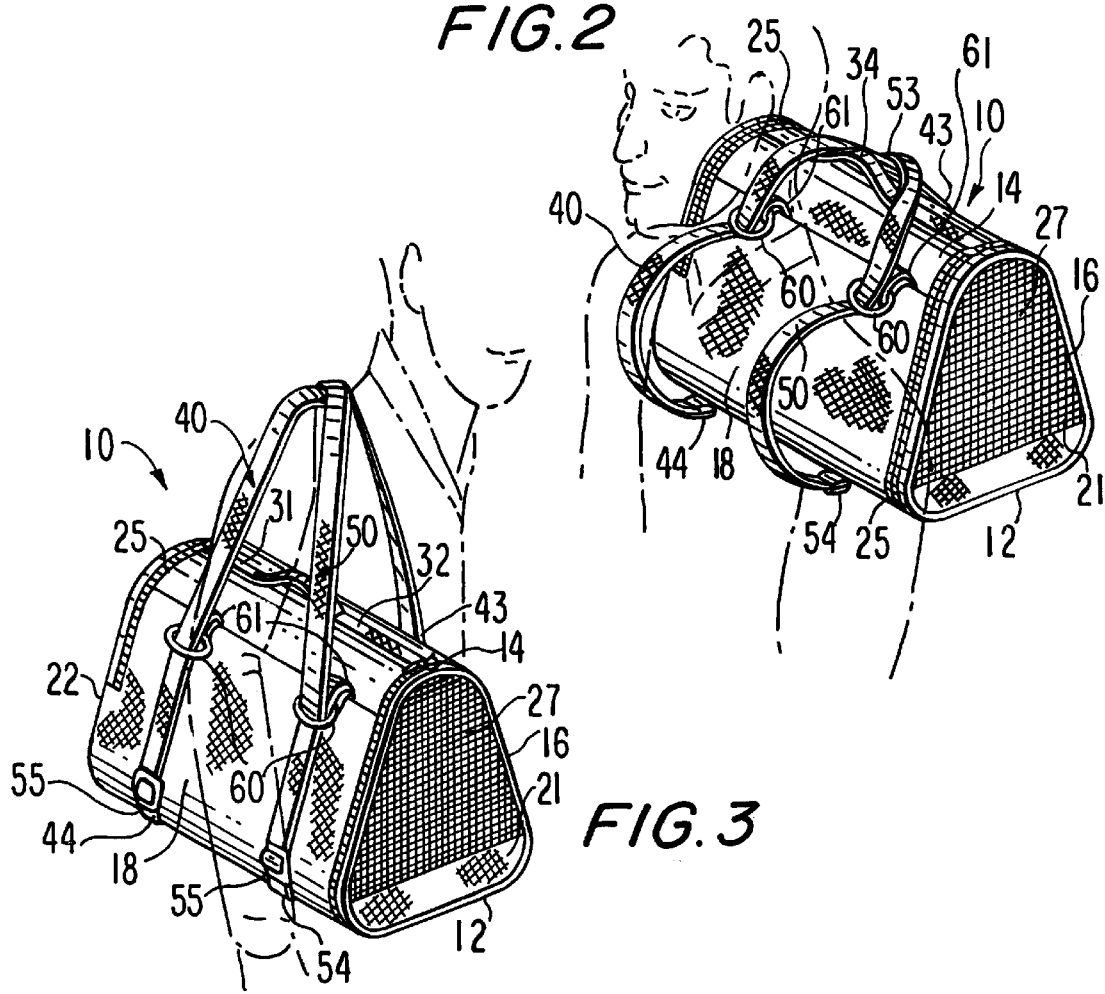

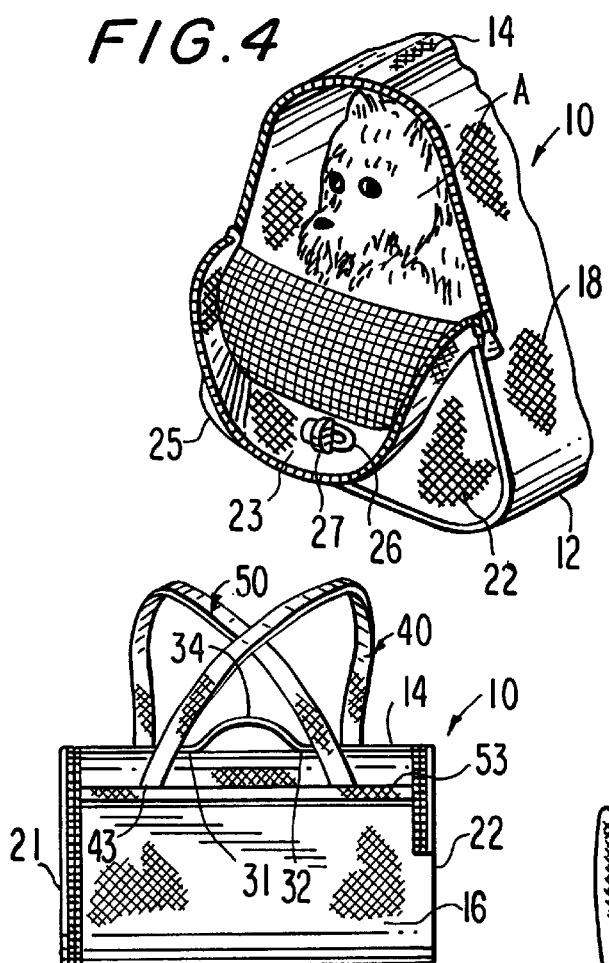
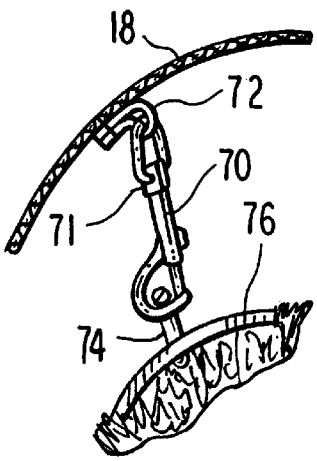
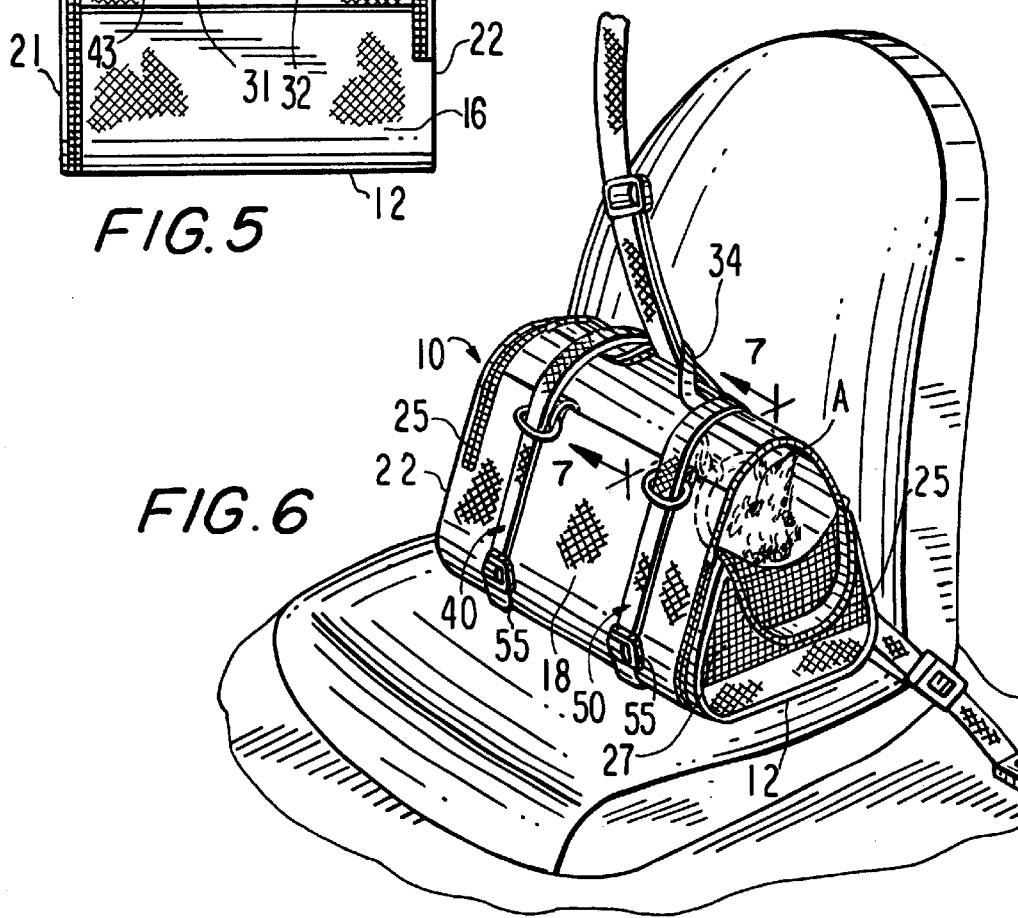

PET CARRIER WITH CONVERTIBLE STRAPS

RELATED APPLICATIONS

This is a continuation in part of my application Ser. No. 08/924,979 filed Sep. 8, 1997 now U.S. Pat. No. 5,941,195, and entitled Animal Carrier.

FIELD OF INVENTION

The present invention relates to a portable animal carrier which permits the safe and humane carrying of a small animal, such as a cat or dog, on a common carrier. When used on an airplane, the portable animal carrier is of a size which can safely accommodate the cat or dog and may be stowed below an airplane seat. The portable animal carrier includes straps which permit the user to tote the carrier in a plurality of modes, which may include a backpack, shoulder bag, and hand carried tote.

BACKGROUND OF THE INVENTION

It is known to provide a portable animal carrier which is of a suitable size, and appropriately constructed, to obtain airline approval for passage within the main carrier cabin. Such a portable animal carrier contains an enclosure including appropriately connected bottom, top, end, front, and rear walls, with at least one of the walls preferably including an area formed of mesh material for providing appropriate ventilation to the interior of the enclosure. At least one of the walls includes a selectively openable closure means, such as a zippered panel, which provides a sufficiently large opening for the convenient insertion and removal of the animal from within the interior volume of the enclosure. In order to facilitate manual carrying of the portable animal carrier, straps are typically secured to appropriate locations, and extend above the top wall. Such straps may include both a hand tote strap and a shoulder strap, so as to provide a versatility of to table options.

While primarily intended for transporting a cat or dog in an approved manner within an aircraft passenger cabin, it is also desirable to safely and conveniently transport the animal within the carrier while the traveler is in the passenger terminal, or en route to or from the airport. The present invention provides a plurality of straps which are suitably placed and configured to also permit the portable animal carrier to function as a backpack.

SUMMARY OF THE INVENTION

In accordance with the present invention, the plurality of carrier straps which are secured to the portable animal carrier includes a pair of straps which can alternatively function as backpack straps or shoulder bag straps. These straps include two straps which crisscross along the rear wall of the portable animal carrier. One of the straps has its first end at a securement location at the top wall, proximate a first end of the portable animal carrier, with its second end being at a securement location at the bottom wall, proximate the opposed second end of the portable animal carrier. The other strap has its first end at a securement location at the top wall proximate the second end of the portable animal carrier, with its second end being at a securement location at the bottom wall proximate the first end of the portable animal carrier. A pair of ring members are also provided, spaced along the top region of the rear wall. A first one of said ring members is proximate the first end of the portable animal carrier, with an intermediate portion of one of the straps loosely extending therethrough. The other ring member is proximate the second end of the portable animal carrier with an intermediate portion of the other strap loosely extending therethrough. These straps may be freely movable through their respective ring members. By virtue of such movement they may be configured in either a first or second condition. The first condition, which will be the backpack mode, is characterized by the straps being taut against the exterior of the animal carrier between their securement location at the top wall and the ring members, with the remaining lengths of the straps loosely extending between the ring members and their securement location at the bottom wall. The second condition, which will be the shoulder bag mode, is characterized by the straps moving through the rings, such that they will be taut against the rear wall between their securement locations and the bottom wall, with the remaining lengths of the straps loosely extending between the ring members and their securement location at the top wall. Thus by moving this pair of crisscross straps between the ring members, the portable animal carrier may be readily converted between the backpack and shoulder bag modes of operation.

In accordance with another preferable feature of the present invention, another strap is provided between securement locations on the top wall, with the intermediate portion of the strap extending upwards of the top wall to provide a handle portion when it is desired to manually carry the portable animal carrier as a hand tote. Advantageously the handle is also further adapted to receive an automobile safety strap when it is desired to contain the portable animal carrier on an automobile seat, such as during transport to or from the airport.

As a further preferable feature of the present invention, the top wall of the portable animal carrier is of a significantly lesser width than its bottom wall, with the front and rear walls inwardly tapering between the bottom and the top walls. This taper advantageously facilitates the smooth placement of the portable animal carrier against the user's body in the backpack and shoulder modes of operation.

In accordance with another feature of the preferred embodiment of the present invention, the interior volume of the portable animal carrier includes a spring biased hook which is adapted to receive a leash ring carried by the animal, for retaining the animal within the interior volume when a portion thereof is opened.

According to still another advantageous feature of the present invention, at least one of the end walls defines a first opening which communicates with the interior volume, and is of a shape and dimension sufficient to facilitate insertion therethrough of the animal into the interior volume and removal therefrom. The opening is associated with a front closure panel having corresponding shape and dimensions whereby the closure panel is movable between a first position which exposes the interior volume through the opening and a second position which closes the opening, such as a zipper around the perimeter of the closure panel.

In accordance with still an additional feature of the preferred embodiment of the present invention, the perimeter of the closure panel includes a manually operable retention means for retaining the closure panel in its open condition in a Dutch door type configuration. This will allow the animal to comfortably move its head outside of the portable animal carrier, it being noted that the leash ring will be secured to the spring biased hook in the interior volume of the portable animal carrier, thereby preventing the animal from moving out of the portable animal carrier until the user releases the spring biased hook holding the leash ring.

Accordingly, it is a primary object of the present invention to provide a portable animal carrier which includes a plurality of carrier straps permitting the animal carrier to function in a plurality of modes, which include a backpack.

A further object of the present invention is to provide such a portable animal carrier which may also be used as a shoulder bag.

An additional object of the present invention is to provide such a portable animal carrier in which the same straps can function to convert the unit between a backpack or a shoulder bag.

An additional object of the present invention is to provide such a portable animal carrier which is of a tapered configuration so as to facilitate the smooth placement against the user's body when it is in the backpack and shoulder bag modes of operation.

These as well as other objects of the present invention become apparent upon a description of the following drawings:

BRIEF DESCRIPTION OF THE DRAWINGS

FIG. 1 is a perspective view of the portable animal carrier, in the hand carried tote mode of operation.

FIG. 2 is a perspective view of the portable animal carrier, in the backpack mode of operation.

FIG. 3 is a perspective view of the portable animal carrier, in the shoulder bag mode of operation.

FIG. 4 is a perspective view of a portion of one end of the portable animal carrier, with its closure panel being shown open, and retained in that position.

FIG. 5 is a front view of the portable animal carrier.

FIG. 6 is a perspective view of the portable animal carrier of the present invention being placed upon, and safely maintained on, an automobile seat.

FIG. 7 is a cross sectional view along the line 7—7 as shown in FIG. 6 and looking in the direction of the arrows.

DETAILED DESCRIPTION OF THE PREFERRED EMBODIMENTS

Referring initially to FIGS. 1–3, portable animal carrier 10 includes a bottom wall 12, top wall 14, front wall 16, and rear wall 18, as well as end walls 21 and 22 which collectively define an interior volume for receiving an animal A oriented head-to-tail between the end walls (such as shown in FIGS. 4 and 6). The "top" of the enclosure is thus by definition above the animal when it is in an upright orientation as shown in FIGS. 4 and 6. At least one of the end walls, such as 22, includes a closure panel 23 having a zipper 25 about its perimeter which permits the manual opening of the closure panel, with such opening providing access to the interior volume of the portable animal carrier sufficient for placement and removal of the animal A. Preferably the other end wall 21 may also be opened by a similar zipper 25 about a perimeter portion thereof.

The walls forming the portable animal carrier may be formed of a variety of materials, with black vinyl microfiber being a particularly advantageous material which is rugged, attractive, and may easily be cleaned. Further, various portions of the walls preferably include mesh material 27 for providing ventilation to the interior volume thereof.

In accordance with the present invention a plurality of straps 30, 40, and 50 are provided to readily permit the user to tote the portable animal carrier 10 as either a hand carried tote, backpack, or shoulder pack. Strap 30 is secured to the central portion of the top wall 14. A central handle 34 extends upward between spaced strap securement locations 31 and 32.

The straps 40 and 50 pass over the top wall 14 and crisscross between their respective ends, and include length adjustable buckles 55. Strap 40 has one of its ends secured to the carrier at a securement location 43 near the top wall, proximate end 21 and its other end at a securement location 44 at the bottom wall proximate the opposed end 22. Strap 50 has one of its ends attached at a securement location 53 near the top wall proximate end wall 22, with its opposite end at a securement location 54 at the bottom wall, proximate wall 21. Straps 40 and 50 loosely extend through rings 60 which are secured to the top region of rear wall 18 by fabric loops 61. Thus it should be appreciated that the intermediate portions of straps 40 and 50 loosely extend between their respective rings, and may readily pass through the respective rings for adjusting lengths of straps 40 and 50 which are respectively below or above the rings 60.

Straps 40 and 50 may preferably be moved between two conditions of operation. The first condition, in which the pet carrier will function as a backpack, is shown in FIG. 2. It is characterized as straps 40 and 50 being taut against the front wall between their securement locations 43 and 53 near the top wall and the ring members 60, with the remaining length of straps 40 and 50 loosely extending between the ring members 60 and their securement locations 44, 54 at tile bottom wall. Should it then be desired to convert the pet carrier 10 to the shoulder bag mode of operation, straps 40 and 50 are upwardly moved through the loops 60 such that they will be taut against the rear wall between the securement locations 44, 54 at the bottom wall and the ring members 60, with the remaining lengths of straps 40 and 50 loosely extending between the ring members 60 and their securement locations 43, 53 near the top wall, as shown in FIG. 3.

As a further advantageous feature of the pet carrier case 10, at least one of the end walls, such a s 22 shown in FIG. 4, includes a closure panel 23 which may be retained in the open condition, so as to permit the animal to comfortably position its head outside of the pet carrier. To retain the closure panel 23 in this condition, a retention means is provided which includes the turn buckle 27 which may be manually inserted through reinforced opening 26, with the turn buckle 27 then rotated 90° to the condition shown in FIG. 4. In order to maintain the animal within the pet carrier, particularly when closure panel 23 is retained in the open condition as shown in FIG. 4, a spring biased hook 70 (see FIG. 7) is secured to the upper region of the interior volume of the pet carrier , as by fabric loop 72. The spring biased hook member 70 may be manually opened by button 71 to receive a leash ring 74 which will be secured to the animal's neck by collar 76.

In accordance with another preferable feature of the present invention, top wall 14 is of a significantly lesser width than bottom wall 12 with the front and rear walls 16, 18 inwardly tapering between the bottom and top walls. This provides an overall profile of the pet carrier to facilitate its smooth placement against the user's body in both the backpack and shoulder modes of operation as shown in FIGS. 2 and 3.

Although not intended to be limiting, the portable animal carrier, which is designed to receive a cat or dog, and may be placed under an airline seat, may typically have the following dimensions:

Height: 12"

Width at bottom: 8"

Width at top: 4"

Length: 15"

It is therefore seen that the present invention provides a conveniently to table portable animal carrier which comfortably and safely holds the animal and may be carried by the user in a variety of modes, including a backpack, shoulder pack, and hand carrying tote. Although the present invention has been described in conjunction with a preferred embodiment it should naturally be understood that various modifications may be made thereto. Accordingly, it is intended that the invention be defined by the following claims:

I claim:

1. A portable animal carrier comprising:

an enclosure having two ends, an opening for receiving into said enclosure an animal oriented head-to-tail between said ends of said enclosure, opposing sides extending between said ends, and a top extending between said ends above an animal oriented in a generally horizontal upright position within said enclosure; and first and second carrier straps having first ends attached to one said side of said enclosure at spaced-apart securement locations and second ends attached to said opposing side of said enclosure at spaced-apart securement locations, wherein said straps are long enough between their respective securement locations to enable said enclosure to be carried either as a backpack using each said strap over a different shoulder of a user of the carrier or as a shoulder tote using both of said straps over one shoulder of the user, with an animal in said enclosure in a generally horizontal upright orientation with one of said sides of said enclosure against the body of the user.

2. A portable animal carrier according to claim 1, wherein:

said securement location of said first carrier strap at said first end is proximate to said top and to one said end of said enclosure at a front side thereof and at said second end is proximate to a bottom and to the other said end of said enclosure at a rear side thereof; and said securement location of said second carrier strap at said first end is proximate to said top and to said other end of said enclosure at said front side thereof and at said second end is proximate to said bottom and to said one end of said enclosure at said rear side thereof, so that said straps crisscross between their respective ends.

3. A portable animal carrier according to claim 2, further comprising a carrier handle on said top of said enclosure.

4. A portable animal carrier according to claim 3, wherein:

said first carrier strap is adjustable in length and passes through a first ring member attached to said enclosure proximate to said top and to said other end of said enclosure at said rear side thereof;

said second carrier strap is adjustable in length and passes through a second ring member attached to said enclosure proximate to said top and to said one end of said enclosure at said rear side thereof; and said carrier straps crisscross between said first ends thereof and said ring members and freely pass through said ring members so that said enclosure can be carried as a backpack by forming from each said carrier strap between said second end thereof and a respective said ring member a separate shoulder loop extending from said rear side of said enclosure and as a shoulder tote by forming from both said carrier straps between said first ends thereof and said respective ring members a crisscrossed shoulder loop extending above said top of said enclosure.

5. A portable animal carrier according to claim 4, wherein said enclosure is narrower at said top than at said bottom to facilitate smooth placement against the user's body when carried as a backpack or a shoulder tote.

6. A portable animal carrier according to claim 3, wherein said carrier handle forms a loop adapted to receive an automobile safety strap for retaining said enclosure on an automobile seat.

7. A portable animal carrier according to claim 1, further including an interior hook in said enclosure for receiving a leash ring in place on the animal and restraining the animal within said enclosure.

8. A portable animal carrier according to claim 1, wherein at least one said end of said enclosure includes an opening having dimensions sufficient to enable insertion of an animal into said enclosure and said carrier further comprises a closure panel movable between an open position exposing the interior of said enclosure for insertion or removal of said animal and a closed position for retaining said animal in said enclosure.

9. A portable animal carrier according to claim 8, wherein said closure panel has a partially open position through which the animal can pass its head and said carrier further comprises a retention member for holding said closure panel in said partially open position.

10. A portable animal carrier comprising:

an enclosure having two ends, a top, a bottom, and front and rear sides defining an enclosure of which a portion is made of a mesh material for ventilation of said enclosure;

an opening in at least one said end of said enclosure, said opening having dimensions sufficient to enable insertion into said enclosure an animal oriented head-to-tail between said ends of said enclosure with said top above said animal in an upright orientation;

a zippered flap having a closed position for closing said opening and an open position for permitting the animal to be inserted into said enclosure and removed therefrom;

a carrying handle at said top of said enclosure;

two adjustable-length carrier straps, wherein a first end of one said carrier strap is attached to said front side of said enclosure at a securement location proximate to said top and to one said end of said enclosure, and a second end of said one carrier strap is attached to said rear side of said enclosure at a securement location proximate to said bottom and to the other said end of said enclosure and wherein a first end of the other said carrier strap is attached to said front side of said enclosure at a securement location proximate to said top and to said other end of said enclosure, and a second end of said other said carrier strap is attached to said rear side of said enclosure at a securement location proximate to said bottom and to said one end of said enclosure;

a first ring member attached to said rear side of said enclosure proximate to said top and to said other end of said enclosure, said one strap freely passing through said first ring member; and a second ring member attached to said rear wall of said enclosure proximate to said top and to said one end of said enclosure, said other strap freely passing through said second ring member, wherein said carrier straps crisscross between said first ends thereof and said ring members;

wherein said enclosure can be carried as a backpack with said animal being in a generally horizontal upright orientation by forming a separate shoulder loop from each said carrier strap extending from said rear side of said enclosure between said second end thereof and said respective ring member and as a shoulder tote with said animal being in a generally horizontal upright orientation by forming a crisscrossed shoulder loop from both said carrier straps between said first ends thereof and said respective ring members above said top of said enclosure.

11. A portable animal carrier according to claim 10, wherein said enclosure is narrower at said top than at said bottom to facilitate smooth placement against a user's body when carried as a backpack or a shoulder tote.

12. A portable animal carrier according to claim 10, wherein said carrying handle forms a loop adapted to receive an automobile safety strap for retaining said enclosure on an automobile seat.

13. A portable animal carrier according to claim 10, further including a second opening in the other said end of said enclosure, said second opening having dimensions sufficient to enable insertion of an animal into said enclosure and a second zippered flap having a closed position for closing said second opening and an open position for permitting the animal to be inserted into said enclosure and removed therefrom through said second opening.

14. A portable animal carrier according to claim 13, wherein at least one of said flaps has a partially open position through which the animal can pass its head and said carrier further comprises a retention member for holding said one flap in said partially open position.

* * * * *